United States Patent
Nishida et al.

(10) Patent No.: US 6,185,112 B1
(45) Date of Patent: Feb. 6, 2001

(54) SWITCHING POWER SUPPLY HAVING A FREQUENCY LIMITING CIRCUIT

(75) Inventors: Akio Nishida; Koji Nakahira, both of Kyoto; Ryota Tani, Otokuni-gun, all of (JP)

(73) Assignee: Murata Manufacturing Co., Ltd. (JP)

( * ) Notice: Under 35 U.S.C. 154(b), the term of this patent shall be extended for 0 days.

(21) Appl. No.: 09/232,786

(22) Filed: Jan. 19, 1999

(30) Foreign Application Priority Data

Jan. 28, 1998 (JP) .................................................. 10-016139

(51) Int. Cl.$^7$ .................................................. H02M 3/335
(52) U.S. Cl. .................................................. 363/19; 363/97
(58) Field of Search .................................. 363/190, 21, 97

(56) References Cited

U.S. PATENT DOCUMENTS

| | | | | |
|---|---|---|---|---|
| 4,283,759 | * | 8/1981 | Koiki ........................................ | 363/19 |
| 4,758,937 | * | 7/1988 | Usui et al. ............................... | 363/97 |
| 4,763,235 | * | 8/1988 | Morita ...................................... | 363/19 |
| 4,763,236 |   | 8/1988 | Usi ............................................ | 363/19 |
| 4,956,761 | * | 9/1990 | Higashi .................................... | 363/97 |
| 4,958,268 | * | 9/1990 | Nagagata et al. ...................... | 363/19 |
| 5,675,479 | * | 10/1997 | Tani et al. .............................. | 363/19 |
| 5,719,755 | * | 2/1998 | Usui .......................................... | 363/19 |
| 5,812,383 | * | 9/1998 | Majid et al. ............................. | 363/21 |
| 5,838,556 | * | 11/1998 | Yokoyama ............................... | 363/19 |
| 5,852,550 | * | 12/1998 | Majid et al. ............................. | 363/21 |
| 5,978,234 | * | 11/1999 | Nagahira ................................. | 363/19 |

\* cited by examiner

*Primary Examiner*—Jeffrey Sterrett
(74) *Attorney, Agent, or Firm*—Ostrolenk, Faber, Gerb & Soffen, LLP (57) ABSTRACT

A switching power supply device comprises: a transformer having a primary winding, a secondary winding and a feedback winding; a switching element connected in series with the primary winding; a controlling element connected to a control terminal of the switching element; a controlling circuit provided between the controlling element and the feedback winding; a rectifying circuit connected to the secondary winding; and a frequency limiting circuit including a charging circuit and a kick voltage absorbing circuit. The charging circuit is adapted to be charged by a voltage reverse in polarity, produced in the feedback winding. The kick voltage absorbing circuit absorbs a current developed by a kick voltage in the feedback winding, by discharge of the charging circuit, whereby the frequency limiting circuit reducing the switching frequency of the switching element by prolongation of the off-state time-period of the switching element in correspondence to a light load signal from a load when the load is light.

8 Claims, 5 Drawing Sheets

SWITCHING POWER SUPPLY HAVING A FREQUENCY LIMITING CIRCUIT

BACKGROUND OF THE INVENTION

1. Field of the Invention

The present invention relates to a switching power supply device, and more particularly, to a switching power supply device employing an RCC (ringing choke converter) system.

2. Description of the Related Art

In general, for equipment and apparatus such as VTR, facsimile equipment, and so forth, a stable direct current voltage is required. In order to supply a stable direct current voltage from a commercial alternating current power supply, is widely used a switching power supply device employing an RCC system of which the configuration is relatively simple and the efficiency is high.

Figure 4:
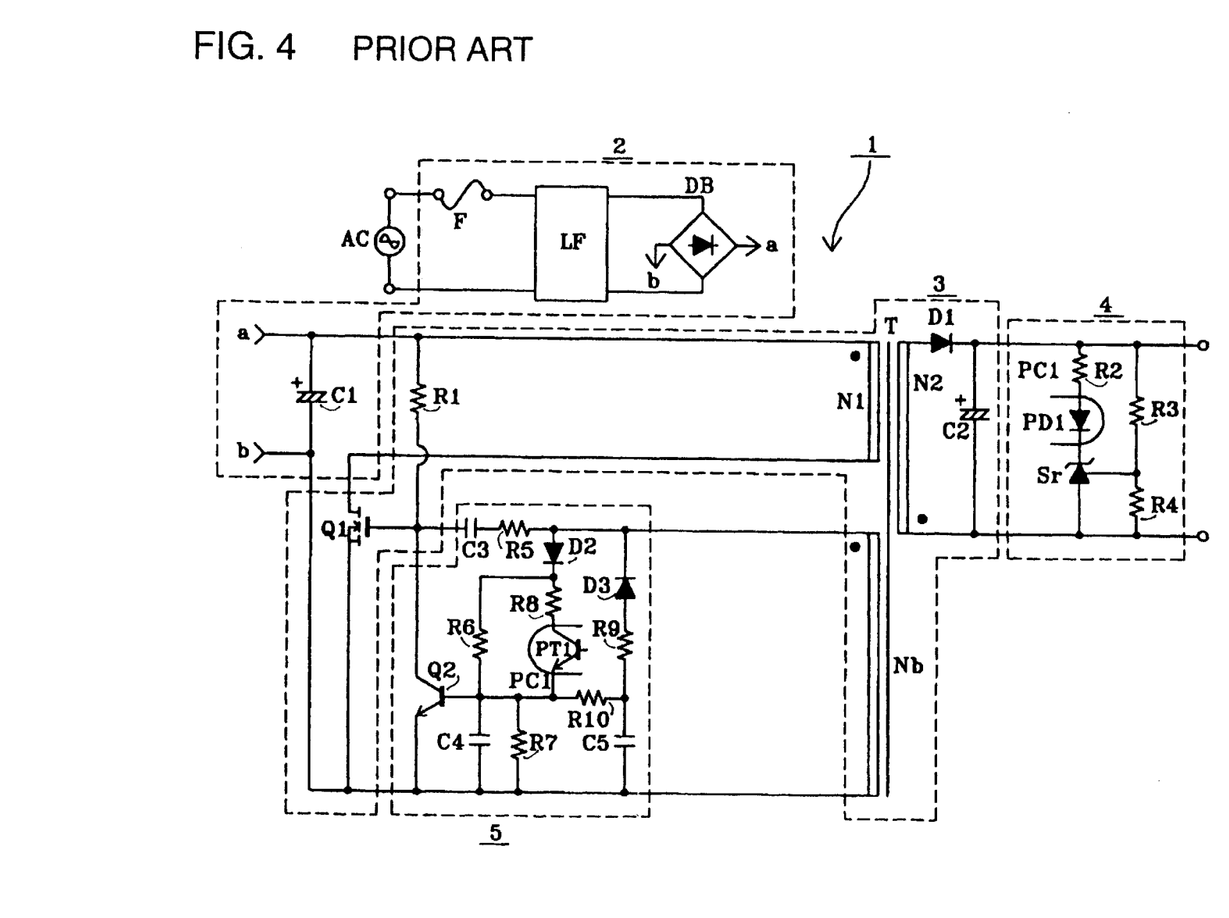
FIG. 4 is a circuit diagram showing a conventional switching power supply device.

In FIG. 4, there is shown a conventional RCC system switching power supply device. In FIG. 4, the switching power supply device 1 is formed of an input circuit 2, a DC—DC converter circuit 3, a voltage detecting circuit 4, and a control circuit 5.

The input circuit 2 is made up of a rectifying diode bridge DB coupled to an AC power supply. A fuse F is provided between the AC power supply and the diode bridge DB. A line filter LF and a smoothing capacitor C1 are connected across the output terminals of the diode bridge DB.

The DC—DC converter circuit 3 is made up of a transformer T having a primary winding N1, a secondary winding N2 opposite in polarity to the primary winding N1, and a feedback winding Nb having the same polarity as the primary winding N1, FET Q1 as a switching element, connected in series with the other end of the primary winding N1, a starting-up resistor R1 connected between one end of the primary winding N1 and the gate of FET Q1 as a controlling terminal, a rectifying diode D1 connected in series with the other end of the secondary winding N2, and a smoothing capacitor C2 connected between the cathode of the diode D1 and one end of the secondary winding N2.

A voltage detecting circuit 4 provided on the output side of the DC—DC converter circuit 3 is made up of a resistor R2, a light emitting diode PD1 on the light emitting side of a photocoupler PC1, a shunt regulator Sr and resistors R3, R4. The resistor R2, the shunt regulator Sr, and the resistors R3, R4 are connected in series with one another, and provided in parallel to the capacitor C2 of the DC—DC converter circuit 3. The resistors R3, R4 are connected in series with each other, and provided in parallel to the capacitor C2. A connection of the resistors R3, R4 is connected to the shunt regulator Sr.

The control circuit 5 is made up of a resistor R5 and a capacitor C3 connected in series with each other, provided between one end of the feedback winding Nb and the gate of FET Q1, a transistor Q2 as a controlling element, connected between the gate of FET Q1 and the other end of the feedback winding Nb, a diode D2 with its anode connected to the one end of the feedback winding Nb, a resistor R6 connected between the cathode of the diode D2 and the base of the transistor Q2 as the controlling terminal, a capacitor C4 connected between the base of the transistor Q2 and the other end of the feedback winding Nb, a resistor R7 connected in parallel to the capacitor C4, a resistor R8 and a phototransistor PT1 on the light reception side of the photocoupler PC1 connected in series with each other, provided between the cathode of diode D2 and the base of the transistor Q2, a diode D3 with its cathode connected to one end of the feedback winding Nb, a resistor R9 and a capacitor C5 connected in series with each other, provided between the anode of the diode D3 and the other end of the feedback winding Nb, and a resistor R10 connected between a connection of the resistor R9 with the capacitor C5 and the base of the transistor Q2.

Figure 5:
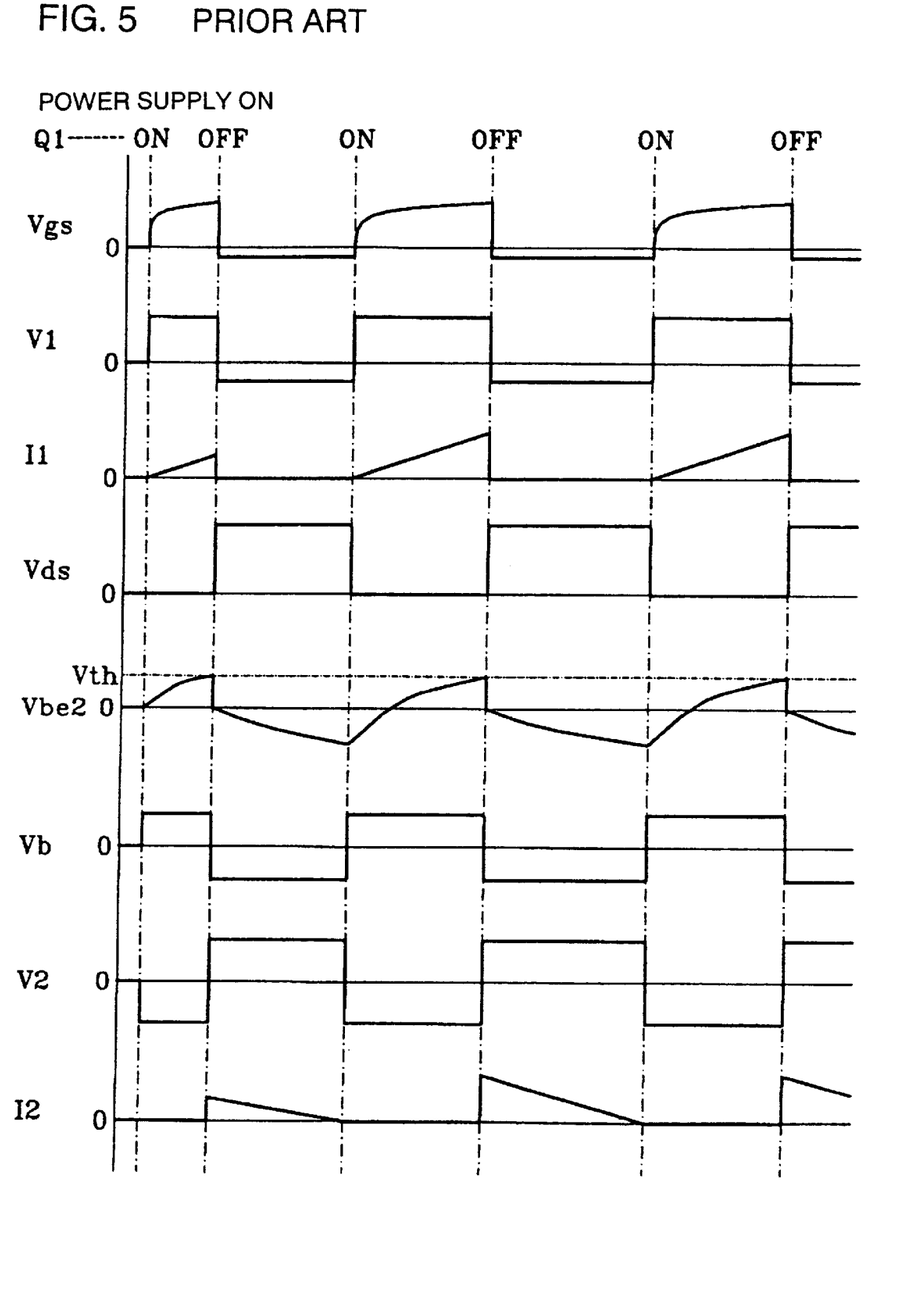
FIG. 5 is a graph showing the time-dependent change of voltage and current in the respective parts of the switching power supply device of FIG. 4.

The operation of the switching power supply device 1 shown in FIG. 4 will be now described with reference to the graph of FIG. 5 showing the change of voltage and current in the relevant respective portions of the switching power supply device 1. In FIG. 5, Vgs, V1, I1, Vds, Vbe2, Vb, V2, and I2 represent the gate-source voltage of FET Q1, a voltage applied to the primary winding N1, a current flowing in the primary winding N1, the drain-source voltage of FET Q1, the base-emitter voltage of the transistor Q2, a voltage produced in the feedback winding Nb, a voltage produced in the secondary winding N2, and a current flowing in the secondary winding N2, respectively. ON, OFF written in the upper portion of the graph represent the timing when FET Q1 is turned from OFF to ON (hereinafter, referred to as "turn-on") and from ON to OFF (hereinafter, referred to as "turn-off"), respectively.

First, the instant that the power supply is turned on for starting up, FET Q1 is off, so that no current flows in the primary winding N1. However, a current flows into the internal capacitor formed between the gate-source of FET Q1, through the starting-up resistor R1. Thereby, the gate-source voltage of FET Q1 is raised. At the time when the voltage Vgs exceeds the threshold of FET Q1, FET Q1 begins to be turned on, and then, the drain-source voltage Vds of FET Q1 becomes nearly zero. As a result, a voltage from the power supply is applied to the primary winding N1 of the transformer T, causing the current Ti to begin to flow. Thereby, voltages Vb, V2 are produced in the feedback winding Nb and the secondary winding N2, respectively. The voltage Vb produced in the feedback winding Nb makes a current flow into the gate of FET Q1 from the feedback winding Nb through the resistor R5 and the capacitor C3. This accelerates the rising-up of the gate-source voltage Vgs of FET Q1, so that FET Q1 is completely turned on. In this case, no current flows in the secondary winding N2, since voltage V2 produced in the secondary winding N2 is in the backward direction with respect to the rectifying diode D1.

When FET Q1 is turned on and a voltage Vb positive in polarity is produced, the capacitor C4 is charged through the diode D2, the resistor R6, and the resistor R8 and the phototransistor PT1 as described below, so that the voltage across the opposite ends of the capacitor C4, namely, the base-emitter voltage Vbe 2 of the transistor Q2 is raised. In this case, the charging speed (time constant) is determined by the values of the resistors R6, R7, and R8, and the capacitor C4, and the phototransistor PT. When the base-emitter voltage Vbe2 of the transistor Q2 is raised to exceed a threshold Vth of the transistor Q2, the transistor Q2 is turned on. When the transistor Q2 is turned on, the collector-emitter voltage of the transistor Q2, namely, the gate-source voltage Vgs of FET Q1 becomes nearly zero, acting to turn off FET Q1.

When FET Q1 begins to turn off, the voltage V1 applied to the primary winding N1 becomes zero, and also the current I1 flowing in the primary winding N1 becomes zero. However, voltages in the primary winding N1, the secondary winding N2, and the feedback winding Nb, reverse in polarity to those applied until then, are produced, due to magnetic energy stored in the transformer T, caused by the current I1 which has flown in the primary winding N1 in the on-state of FET Q1. A voltage is produced in the primary winding N1, which is n (ratio of turns of the primary winding to the secondary winding) times higher than the voltage V2 produced in the secondary winding N2, having the reverse polarity. The current I2, caused by the voltage V2 produced in the secondary winding N2, having a reverse polarity, flows through the diode D1, and is smoothed in the capacitor C2 to be outputted. The voltage Vb generated in the feedback winding Nb, having the reverse polarity, rapidly absorbs the electric charge from the internal capacitor formed between the gate and the source of FET Q1, through the capacitor C3 and the resistor R5, completely turning off FET Q1. At the same time, the feedback winding Nb absorbs the electric charge stored in the capacitor C4, through the resistors R10, R9 and the diode D3. However, since a voltage reverse in polarity is applied to the capacitor C4, the capacitor C4, after it is discharged, is charged in the reverse direction, and the base-emitter voltage Vbe of the transistor Q2 is negatively biased, resulting in the turn-off of the transistor Q2. Thus, the transistor Q2 turns on only at the instant that it triggers the turn off of FET Q1.

While FET Q1 is off, the current I2 flowing in the secondary winding N2 is reduced stepwise with release of the magnetic energy from the transformer T, and finally becomes zero. When the current I2 flowing in the secondary winding N2 becomes zero, the voltages V2 and Vb generated in the secondary winding N2 and the feedback winding Nb, respectively, tend to be damped, oscillating on the baseline of zero voltage. In this case, the voltage, of which the reverse polarity is temporarily changed to the positive polarity in the feedback winding Nb, is called a kick voltage. When the kick voltage is generated in the feedback winding Nb, a current flows into the internal capacitor formed between the gate and the source of FET Q1, from the feedback winding Nb through the resistor R5 and the capacitor C3, increasing the gate-source voltage Vgs of FET Q1. If the kick voltage is higher than a predetermined value, the gate-source voltage Vgs exceeds a threshold to turn FET Q1 on. At this time, less current flows in the starting-up resistor R1, since the starting resistor R1 is set to a high resistance. Accordingly, the current flowing in the starting-up resistor R1 has no function of turning FET Q1 on. When FET Q1 is turned on, the voltages V2 and Vb generated in the secondary winding N2 and the feedback winding Nb, respectively are forced toward the positive polarity, so that the oscillation of the voltage is forcedly stopped.

After the forced stopping, the same operation as in the starting-up is repeated. That is, FET Q1 is turned on and off repeatedly, and thus, the switching power supply device operates.

Lastly, the voltage stabilization operation will be described. The output power is divided by the resistors R3, R4 to be detected, and is inputted into the shunt regulator Sr. The shunt regulator Sr compares the inputted voltage with its internal reference voltage, and makes the current flow which is in correspondence to the difference between the compared voltages.

In case a load (not shown) connected to the switching power supply device 1 is light (draws low current) and the output voltage is raised, the voltage at the connection between the resistors R3, R4 is increased. As a result, the input voltage to the shunt regulator Sr is increased, making a larger current start to flow. With an increased current flowing in the shunt regulator Sr, the current flowing in the light emitting diode PD1 of the photocoupler PC1, which is connected in series with the shunt regulator Sr, is increased, thereby increasing the quantity of light emitted from the light emitting diode PD1. With increase of the quantity of light emitted from the light emitting diode PD1, a current flowing in the phototransistor PT1 of the photocoupler PC1 is increased. The current flowing in the phototransistor PT1, together with the current flowing in the resistor R6 when the voltage Vb generated in the feedback winding Nb is positive in polarity as described above, acts to charge the capacitor C4. Accordingly, when the current flowing in the phototransistor PT1 is increased, the time taken to charge the capacitor C4 is shortened. As a result, the time taken until the transistor Q2 is turned on is shortened, and also the time until FET Q1 is turned off, that is, the time while the FET Q1 is on, is shortened. The short on-state time-period of the FET Q1 reduces the magnetic energy stored in the transformer T and the voltage V2 in the secondary winding N2, resulting in lowering of the output voltage. The time while FET Q1 is off is shortened in proportion to the on-state time-period of FET Q1. Accordingly, the switching frequency of the switching power supply device 1 is increased in correspondence to a decrement in the time-period while FET Q1 is on and off.

To the contrary, when the load (not shown) connected to the switching power supply device 1 is heavy and draws higher current and the output voltage is reduced, the current flowing in the phototransistor PT of the photocoupler PC is decreased, so that the charging time of the capacitor C2 is prolonged. The time until FET Q1 is turned off, that is, the time while FET Q1 is on, becomes longer, the voltage V2 produced in the secondary winding N2 is increased, and the output voltage is increased. Since the on-state time-period of FET Q1 becomes longer, the switching frequency of the switching power supply device 1 is reduced.

In the above-described manner, the switching power supply device 1 attempts to stabilize the voltage.

At the time when FET Q1 is turned on and off, there exists, for a short time, a state wherein a voltage is applied across the drain-source of FET Q1 with a current flowing. At this time, a loss is caused in FET Q1 (hereinafter, referred to as switching loss). The switching loss, generated every time FET Q1 is turned on and off, is increased in proportion to the switching frequency. Accordingly, especially when the load is light, the switching frequency is increased, causing a problem that the efficiency of the switching power supply device 1 deteriorates.

SUMMARY OF THE INVENTION

Accordingly, it is an object of the present invention to provide a switching power supply device wherein the efficiency is enhanced by reducing the switching frequency in correspondence to a light load, such as a VTR, facsimile equipment and the like.

To achieve the above object, according to the present invention, a switching power supply device comprises a transformer having a primary winding, a secondary winding, and a feedback winding, a switching element connected in series with the primary winding, a controlling element connected to a control terminal of the switching element, a controlling circuit provided between the controlling element and the feedback winding, and a rectifying circuit connected to the secondary winding, and further comprising a frequency limiting circuit including a charging circuit adapted to be charged at a voltage reverse in polarity, produced in said feedback winding, and a kick voltage absorbing circuit for absorbing a current developed at a kick voltage in said feedback winding, by discharge of said charging circuit, whereby the switching frequency is reduced by prolongation of the off-state time-period of said switching element in correspondence to a light load signal when the load is light.

According to the present invention, in the switching power supply device, the charging circuit comprises a diode with its cathode connected to one end of the feedback winding, and a capacitor connected between the anode of the diode and the other end of the feedback winding, and the kick voltage absorbing circuit comprises a first resistor, a second resistor, and a switching element connected in series with one another, provided in parallel to the capacitor, and an NPN transistor of which the collector, the emitter, and the base are connected to a controlling terminal of the switching element, a connection between the diode and the capacitor, and a connection between the first resistor and the second resistor, respectively.

According to the present invention, the frequency limiting circuit is made to operate in correspondence to a light load signal from an equipment when the load is light. Thereby, the switching element is prevented from being turned on, which will be caused by the kick voltage produced in the feedback winding, and the switching frequency is reduced, so that the switching loss can be reduced. Thus, the efficiency of the switching power supply device is improved.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

DETAILED DESCRIPTION OF EMBODIMENTS OF THE INVENTION

Hereinafter, the preferred embodiments of the present invention are explained in detail with reference to the drawings.

Figure 1:
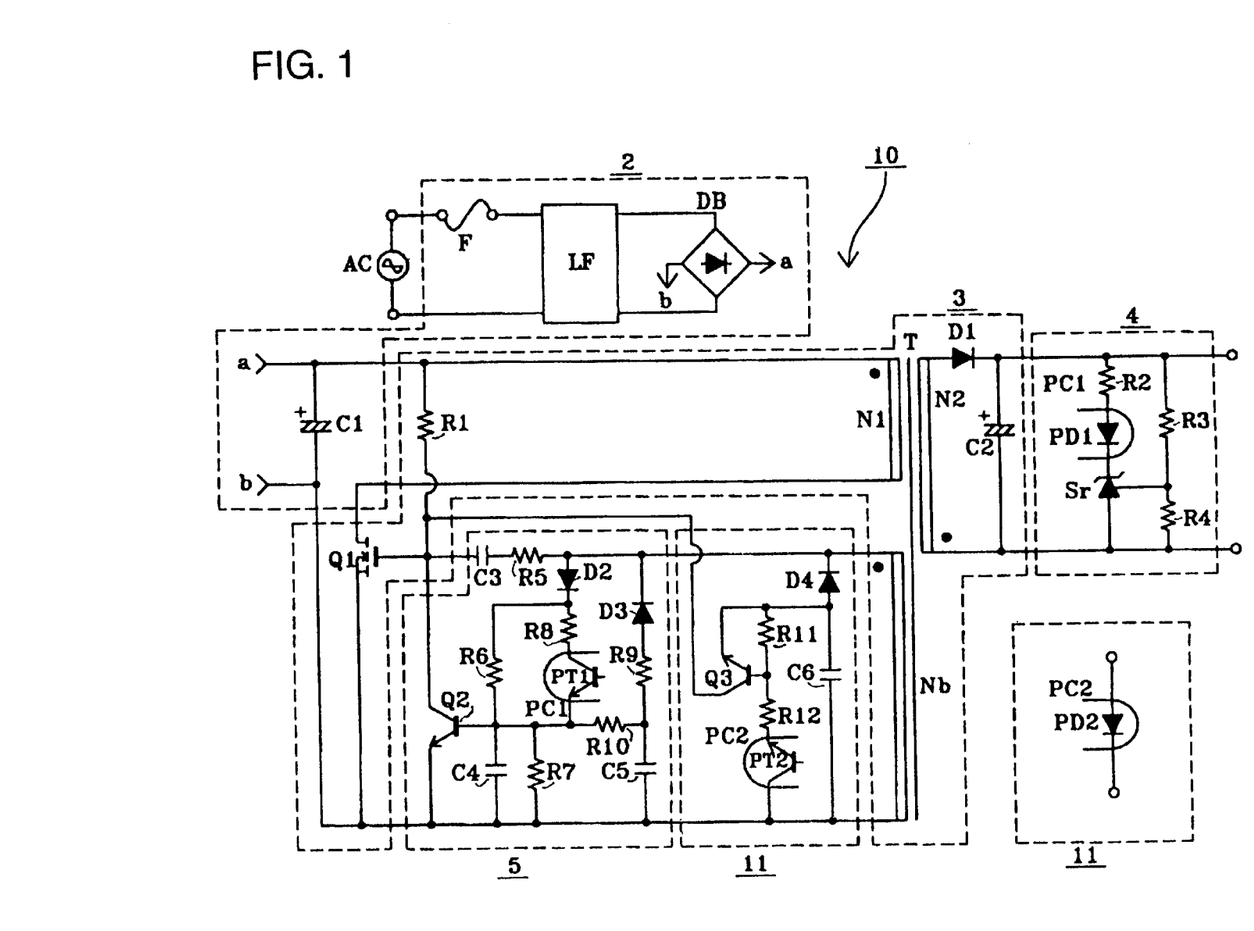
FIG. 1 is a circuit diagram showing a switching power supply device according to an embodiment of the present invention.

In FIG. 1, there is shown a switching power supply device according to an embodiment of the present invention. Like parts or equivalent parts in FIG. 1, to those in FIG. 4, are designated by like reference numerals, and the description of the parts is omitted. The switching power supply device 10 of FIG. 1 is the same as the switching power supply device 1 of FIG. 4, except for the provision of a frequency limiting circuit 11.

The frequency limiting circuit 11 comprises a charging circuit made up of a diode D4 with its cathode connected to one end of the feedback winding Nb, and a capacitor C6 connected between the anode of the diode D4 and the other end of the feedback winding Nb, and a kick voltage absorbing circuit made up of a resistor R11 which is a first resistor, connected to the anode of the diode D4, a resistor R12 which is a second resistor connected in series with the resistor R11, a phototransistor PT2 of a photocoupler PC2 connected between the resistor R12 and the other end of the feedback winding Nb, and an NPN transistor Q3 of which the collector, the emitter, and the base are connected to the gate of FET Q1 as the control terminal, the anode of the diode D4, and a connection between the resistor R11 and the resistor R12, respectively. A photodiode PD2 pairing with the phototransistor PT2 of the photocoupler PC2 is independently provided with its cathode and anode connected to an equipment different from the switching power supply device 10, and is so controlled as to make a current flow in correspondence to a light load signal given from the equipment when the load is light.

Figure 2:
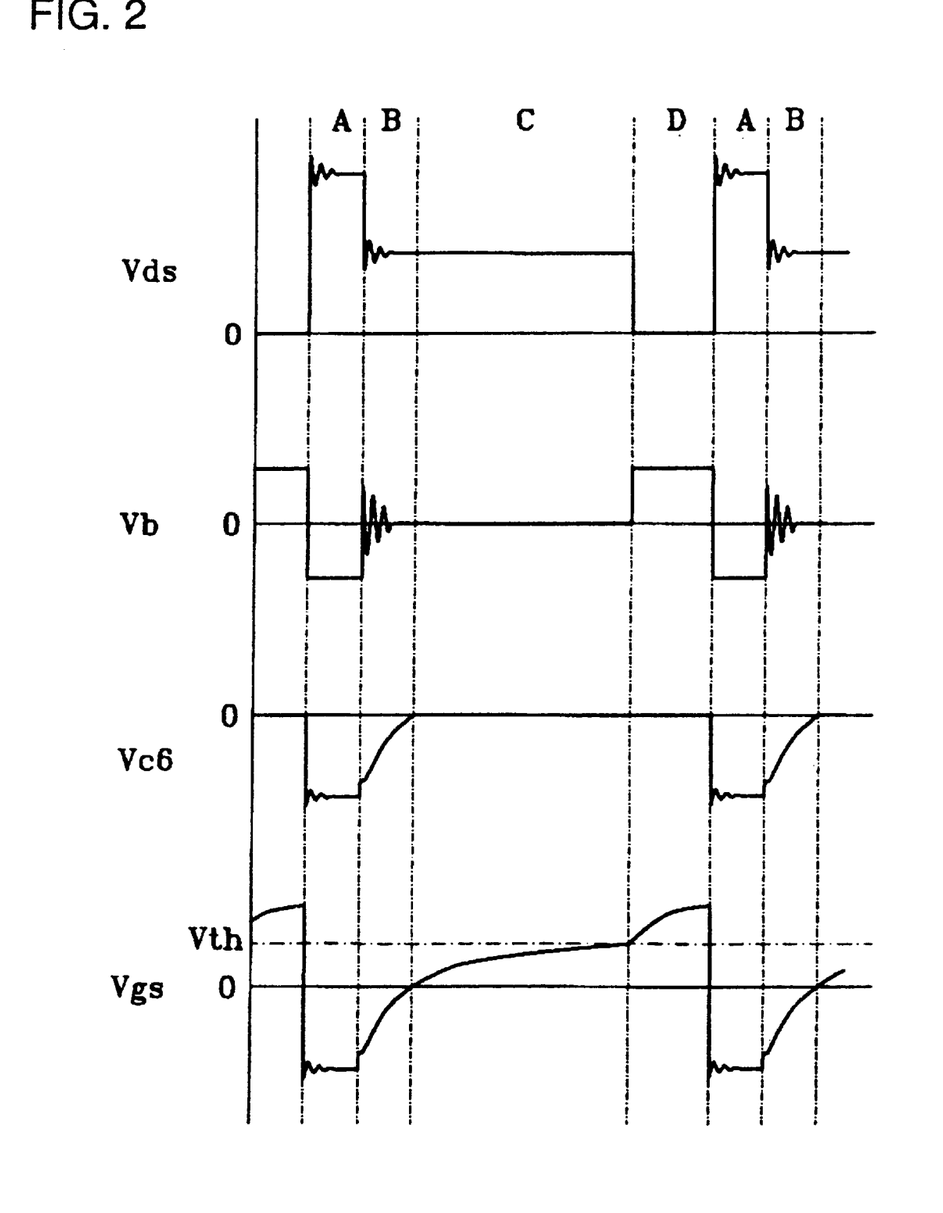
FIG. 2 is a graph showing the time-dependent change of the respective parts of the switching power supply device of FIG. 1.

The operation of the frequency limiting circuit 11 will be now described with reference to FIG. 2. FIG. 2 shows, respectively, the drain-source voltage Vb of FET Q1, the voltage Vb produced in the feedback winding Nb, a voltage Vc6 across the capacitor C6, positive in polarity on the diode D4 side, and the gate-source voltage Vgs which change with the elapse of time. The reference characters A, B, C, and D represent the respective changing states in one period of time, respectively. The reference character Vth represents a threshold of FET Q1.

First, when the load connected to the switching power supply device 10 becomes light and the switching frequency is increased, the light load signal from the equipment controls the photodiode PD2 of the photocoupler PC2 so that a current flows in the photodiode PD2. When the current flows in the photodiode PD2, the phototransistor PT2 goes on, and the frequency limiting circuit 11 starts to operate.

In the state that the frequency limiting circuit 11 operates, when FET Q1 is off (state A), the voltage Vb produced in the feedback winding Nb is reversed in polarity. The diode D4 of the charging circuit is in the forward direction, so that the capacitor C6 is charged with the diode D4 side thereof negative in polarity, that is, with the polarity thereof reversed.

When the current I2 flowing in the secondary winding N2 becomes zero, the voltage Nb produced in the feedback winding Nb is changed to a voltage oscillating from the reverse polarity, on the base line of 0V. In this case, the voltage is in the opposite direction to the diode D4 so that the current ceases to flow. Accordingly, the electric charge stored in the capacitor C6 is discharged through the phototransistor PT2, the resistor R12, and the resistor R11 of the kick voltage absorbing circuit (state B). Thereby, the base-emitter voltage of the transistor Q3 exceeds a threshold so that the transistor Q3 is turned on. Since the collector of the transistor Q3 is connected to the gate of FET Q1, a current caused by the kick voltage generated in the feedback winding Nb, flowing from the feedback winding Nb is absorbed toward the transistor Q3, so that the gate-source voltage Vgs of FET Q1 is prevented from rising to reach the threshold and turn FET Q1 on. When the discharge of the capacitor C6 is completed, the kick voltage developed in the feedback winding Nb has settled, resulting in no current flowing into the gate of FET Q1 from the feedback winding Nb.

After the capacitor C6 is discharged, the transistor Q3 is turned off, and is no longer effective in absorbing the current to flow into the gate of FET Q1. Then, a current flows into the gate of FET Q1 through the starting-up resistor R1 in the same manner as in the starting-up, so that the gate-source voltage Vgs is raised (state C).

When the gate-source voltage Vgs of FET Q1 reaches the threshold Vth, FET Q1 is turned on, and the drain-source voltage Vds of FET Q1 becomes 0V. As a result, the voltage Vb positive in polarity is induced in the feedback winding Nb (state D).

By the operation of the frequency limiting circuit 11 in the above-described manner, FET Q1, which is prevented from being turned on by the kick voltage generated in the feedback winding Nb, is turned on in the same manner as in the starting-up. Since the resistance of the starting-up resistors R1 is set to a high value, the timing of the turn-on of the FET Q1 is delayed. Accordingly, the switching frequency can be reduced.

Figure 3:
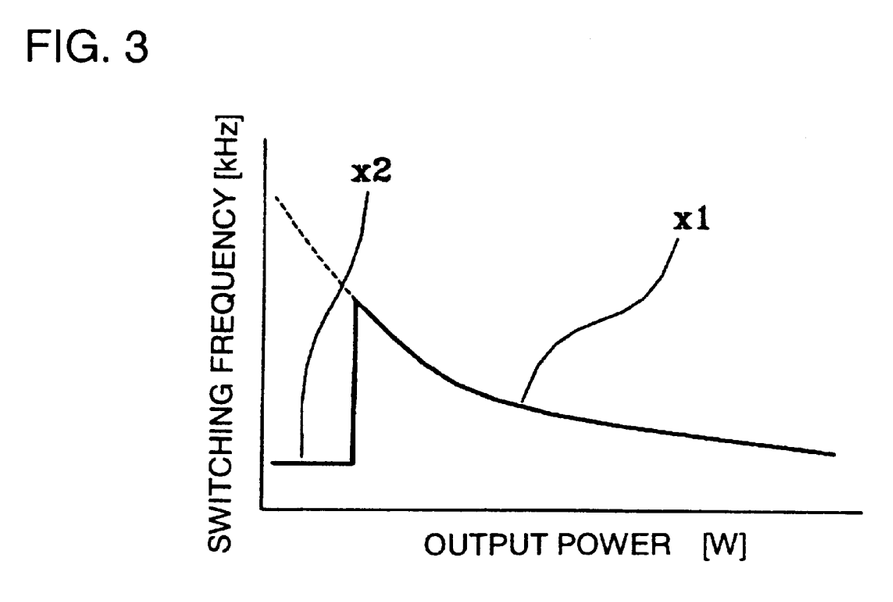
FIG. 3 is a graph showing the correlation between the output power from the switching power supply device of FIG. 1 and the switching frequency.

FIG. 3 shows the correlation between the output power from the switching power supply device 10 and the switching frequency. The reference numeral x1 represents a characteristic of the switching power supply device 1 in the state that the frequency limiting circuit 11 does not operate, and the reference numeral x2 represents a characteristic of the switching power supply device 10 in the state that the frequency limiting circuit 11 operates. As seen in FIG. 3, in the state of no operation of the frequency limiting circuit 11, the switching frequency is rapidly increased as the output power from the switching power supply device 10 is reduced (that is, the load becomes lighter), as illustrated in the dotted line portion of x1. On the other hand, by operation of the frequency limiting circuit 11 when the load is light, the switching frequency can be reduced as shown by x2. As a result, in the switching power supply device according to the present invention, the switching loss when the load is light can be considerably reduced, improving the efficiency of the switching power supply device.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A switching power supply device comprising:
   a transformer having a primary winding, a secondary winding and a feedback winding, the feedback winding producing a feedback voltage including a same polarity voltage having a polarity the same as a voltage in said primary winding, a reverse polarity voltage and a kick voltage;
   a switching element connected in series with said primary winding, the switching element having a switching frequency and having an on-state and an off-state and switching the voltage in the primary winding;
   a controlling element connected to a control terminal of said switching element;
   a controlling circuit provided between said controlling element and said feedback winding;
   a rectifying circuit connected to said secondary winding; and
   a frequency limiting circuit including a charging circuit adapted to be charged by the reverse polarity voltage produced in said feedback winding, and further including a kick voltage absorbing circuit for absorbing a current developed by the kick voltage in said feedback winding, by discharge of said charging circuit, said frequency limiting circuit preventing said switching element from turning on due to the kick voltage generated in said feedback winding in correspondence to a light load signal provided by a load coupled to the power supply device when the load is light.

2. The switching power supply device of claim 1, wherein the charging circuit comprises a charging capacitor and a diode to allow charging of said capacitor by said reverse polarity voltage and the kick voltage absorbing circuit includes a further switching element controlled by the light load signal, a control transistor controlled by the further switching element and having an output coupled to control the switching element and further comprising resistance for discharging the charging capacitor.

3. The switching power supply device of claim 2, wherein the further switching element of the kick voltage absorbing circuit comprises a transistor switching device operated by said light load signal.

4. The switching power supply device of claim 3, wherein the transistor switching device comprises a photo transistor of a photo coupler, a photo diode of said photo coupler receiving the light load signal.

5. The switching power supply device of claim 1, wherein said charging circuit includes a diode with a cathode connected to one end of said feedback winding and a capacitor connected between an anode of said diode and another end of said feedback winding, said kick voltage absorbing circuit comprising a first resistor, a second resistor and a further switching element connected in series with one another and in parallel with said capacitor and an NPN transistor having a collector, emitter and base, said collector, emitter and base being connected to the control terminal of said switching element, a connection between said diode and said capacitor, and a connection between said first resistor and the second resistor, respectively.

6. A switching power supply device according to claim 1, further comprising a starting-up circuit connected between the switching element and one end of the primary winding.

7. A method of reducing switching losses in a switching power supply device, wherein the power supply device comprises a transformer having a primary winding, a secondary winding and a feedback winding, the feedback winding producing a feedback voltage including a same polarity voltage having a polarity the same as a voltage in said primary winding, a reverse polarity voltage and a kick voltage; a switching element connected in series with said primary winding, the switching element having a switching frequency and having an on-state and an off-state and switching the voltage in the primary winding; a controlling element connected to a control terminal of said switching element; a controlling circuit provided between said controlling element and said feedback winding; a rectifying circuit connected to said secondary winding; the method comprising:
   limiting a frequency of operation of the switching element by charging a charging circuit with the reverse polarity voltage produced in said feedback winding and absorbing a current developed by the kick voltage in said feedback winding by discharging the charging circuit in a kick voltage absorbing circuit that prevents the switching element from going into the on-state due to the kick voltage, thereby preventing said switching element from turning on due to the kick voltage generated in said feedback winding in correspondence to a light load signal provided by a load coupled to the power supply device when the load is light.

8. A method of operating a switching power supply device having a transformer having a primary winding, a secondary winding and a feedback winding, the feedback winding producing a feedback voltage including a same polarity voltage having a polarity the same as a voltage in said primary winding, a reverse polarity voltage and a kick voltage; a switching element connected in series with said primary winding, the switching element having a switching frequency and having an on-state and an off-state and switching the voltage in the primary winding; a controlling element connected to a control terminal of said switching element; a controlling circuit provided between said controlling element and said feedback winding; and a rectifying circuit connected to said secondary winding; the method comprising charging a charging circuit with the reverse polarity voltage produced in said feedback winding and absorbing a current developed by the kick voltage in said feedback winding by discharge of said charging circuit, thereby preventing said switching clement from turning on due to the kick voltage generated in said feedback winding in correspondence to a light load signal provided by a load coupled to the power supply device when the load is light.

* * * * *